United States Patent
Volek et al.

(10) Patent No.: US 9,719,641 B1
(45) Date of Patent: Aug. 1, 2017

(54) LAMP WITH PROXIMITY SENSING

(71) Applicant: Humanscale Corporation, New York, NY (US)

(72) Inventors: Robert Volek, Brooklyn, NY (US); Jin Chen, New York, NY (US); Todd Brunner, Madison, WI (US); Krzysztof Sosniak, Stirling, NJ (US)

(73) Assignee: Humanscale Corporation, New York, NY (US)

( * ) Notice: Subject to any disclaimer, the term of this patent is extended or adjusted under 35 U.S.C. 154(b) by 0 days.

(21) Appl. No.: 15/180,008

(22) Filed: Jun. 11, 2016

(51) Int. Cl.
| | |
|---|---|
| *F21S 6/00* | (2006.01) |
| *F21V 7/00* | (2006.01) |
| *F21V 5/04* | (2006.01) |
| *F21V 23/00* | (2015.01) |
| *H05B 33/08* | (2006.01) |
| *F21V 19/00* | (2006.01) |
| *H05B 37/02* | (2006.01) |
| *F21V 29/89* | (2015.01) |
| *F21V 29/70* | (2015.01) |

(Continued)

(52) U.S. Cl.
CPC ............... *F21S 6/006* (2013.01); *F21V 5/04* (2013.01); *F21V 7/00* (2013.01); *F21V 19/003* (2013.01); *F21V 23/002* (2013.01); *F21V 23/02* (2013.01); *F21V 29/70* (2015.01); *F21V 29/89* (2015.01); *H05B 33/0845* (2013.01); *H05B 37/0227* (2013.01); *F21Y 2115/10* (2016.08)

(58) Field of Classification Search
CPC .......... F21V 21/26; F21V 21/28; F21V 21/29; F21S 6/00; F21S 6/006; F21S 6/002; F21S 6/003
See application file for complete search history.

(56) References Cited

U.S. PATENT DOCUMENTS

| | | | | |
|---|---|---|---|---|
| 4,319,314 | A | * | 3/1982 | Morton .................... F21S 8/033 248/282.1 |
| 5,010,460 | A | * | 4/1991 | Lin ......................... F21S 6/002 315/DIG. 4 |

(Continued)

OTHER PUBLICATIONS

Roxxane LED Luminaire Family, http://nimbus-lighting.com/en/products/features/roxxane, known at least as early as Jun. 7, 2016, 13 pgs.

(Continued)

*Primary Examiner* — Robert May
(74) *Attorney, Agent, or Firm* — Womble Carlyle Sandridge & Rice, LLP

(57) ABSTRACT

A lamp is described. The lamp includes a housing made at least partially from an electrically and thermally conductive material. The lamp also includes a primary light source positioned within the housing such that the housing dissipates heat generated by the primary light source. The primary light source configured to emit light in a first direction relative to the housing. The lamp also includes at least one indicator light source positioned relative to the housing to emit light in a second direction relative to the housing, the second direction being substantially opposite the first direction. The lamp also includes a capacitive proximity sensor electrically connected to the housing that triggers illumination of the at least one indicator light source if a user's hand approaches the housing.

23 Claims, 14 Drawing Sheets

(51) Int. Cl.
*F21V 23/02* (2006.01)
*F21Y 115/10* (2016.01)

(56) References Cited

U.S. PATENT DOCUMENTS

| | | | | |
|---|---|---|---|---|
| 5,165,785 | A * | 11/1992 | Doong | F21V 23/04 362/295 |
| 7,221,271 | B2 * | 5/2007 | Reime | H05B 33/0803 340/540 |
| 7,896,568 | B2 * | 3/2011 | Atkinson | E05D 5/125 248/160 |
| 8,408,761 | B2 * | 4/2013 | Ng | F21S 6/003 362/418 |
| 8,596,810 | B2 * | 12/2013 | Lin | F21L 4/08 362/183 |
| 8,714,779 | B2 * | 5/2014 | Ng | H01R 35/04 362/287 |
| 2014/0003069 | A1 * | 1/2014 | Polick | F21S 6/00 362/427 |
| 2014/0355268 | A1 * | 12/2014 | Wood | F21S 6/00 362/268 |

OTHER PUBLICATIONS

Steelcase Dash LED Task Light, https://www.steelcase.com/products/lighting/dash/, known at least as early as Jun. 7, 2016, 11 pgs.
Ardea Desk Light, Herman Miller, http://www.hermanmiller.com/products/accessories/personal-task-lights/ardea- personal-light.html, known at least as early as Jun. 7, 2016, 2 pgs.
Herman Miller Tone Personal Light, http://www.hermanmiller.com/products/accessories/personal-task-lights/tone-personal-light.html, known at least as early as Jun. 7, 2016, 2 pgs.
Link light, Pablo Studio, http://pablodesigns.com/product/link, known at least as early as Jun. 7, 2016, 8 pgs.
Koncept Mosso Pro, http://www.koncept.com/mosso-pro, known at least as early as Jun. 7, 2016, 11 pgs.
Koncept Z-Bar, http://www.koncept.com/Z-Bar, known at least as early as Jun. 7, 2016, 10 pgs.
Flos Kelvin LED Green Mode, http://usa.flos.com/modern-table-lamps/Kelvin-LED-Green-Mode-II, known at least as early as Jun. 7, 2016, 2 pgs.
Artemide Demetra Table Lighting, http://artemide.net/product/demetra-table/, known at least as early as Jun. 7, 2016, 3 pgs.
Artemide Tizio Table, http://artemide.net/product/tizio-table/, known at least as early as Jun. 7, 2016, 2 pgs.

* cited by examiner

LAMP WITH PROXIMITY SENSING

FIELD OF DISCLOSURE

The present disclosure relates to light fixtures, such as those light fixtures generally referred to as lamps.

BACKGROUND

Proper workstation lighting is critical to the effectiveness of office workers. Many workstations are illuminated with overhead lighting. Use of overhead lighting alone requires an overabundance of light across an over inclusive area. The result is significant energy consumption. Use of task lighting in addition to overhead lighting reduces the lighting levels required from the overhead lights, greatly reducing overall energy use. Further, today's office tasks heavily involve reading from backlit screens. Task lighting allows for the generation of focused light when the task requires, such as reading a hard copy page, while helping to reduce eye strain and improve computer-based reading comfort.

Use of task lighting dates back to the candle and kerosene lamp. Today's task lights, however, seek ever increasing energy efficiency with the use of light emitting diode technology, dimming capability and sensor based control. There is also an ever present desire to improve the mechanical and electrical systems of light fixtures to maintain structural and lighting performance while facilitating the manufacture of lamps with simple, elegant, and clean-lined industrial design.

SUMMARY

In one embodiment, the present disclosure describes a lamp having a head with a light source and at least one support arm supporting the head at a joint. The joint allows relative motion between the at least one support arm and the head. The joint includes a sliding electrical contact and a torque insert. The at least one support arm is electrically conductive, and a ground wire is grounded to the support arm, the support arm being in electrical contact with the torque insert.

In another embodiment, the present disclosure includes a lamp comprising a head having a primary light source. The head is connected to a support. The support includes a first support portion at least partially comprising an electrically conductive material, a second support portion at least partially comprising an electrically conductive material, and a first joint connecting the first support portion to the second support portion to allow relative movement between the first support portion and the second support portion. The first joint has a torque insert formed with a conductive exterior housing. The first joint provides two current conducting paths from the first support portion to the second support portion. A first current conducting path comprises electrically charging the first support portion, and contact conduction from the electrically conductive material of the first support portion to the electrically conductive material of the second support portion through the exterior housing of the torque insert. A second current conducting path comprises a sliding electrical contact electrically isolated from the conductive material of the first support portion, the conductive material of the second support portion, and the torque insert.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
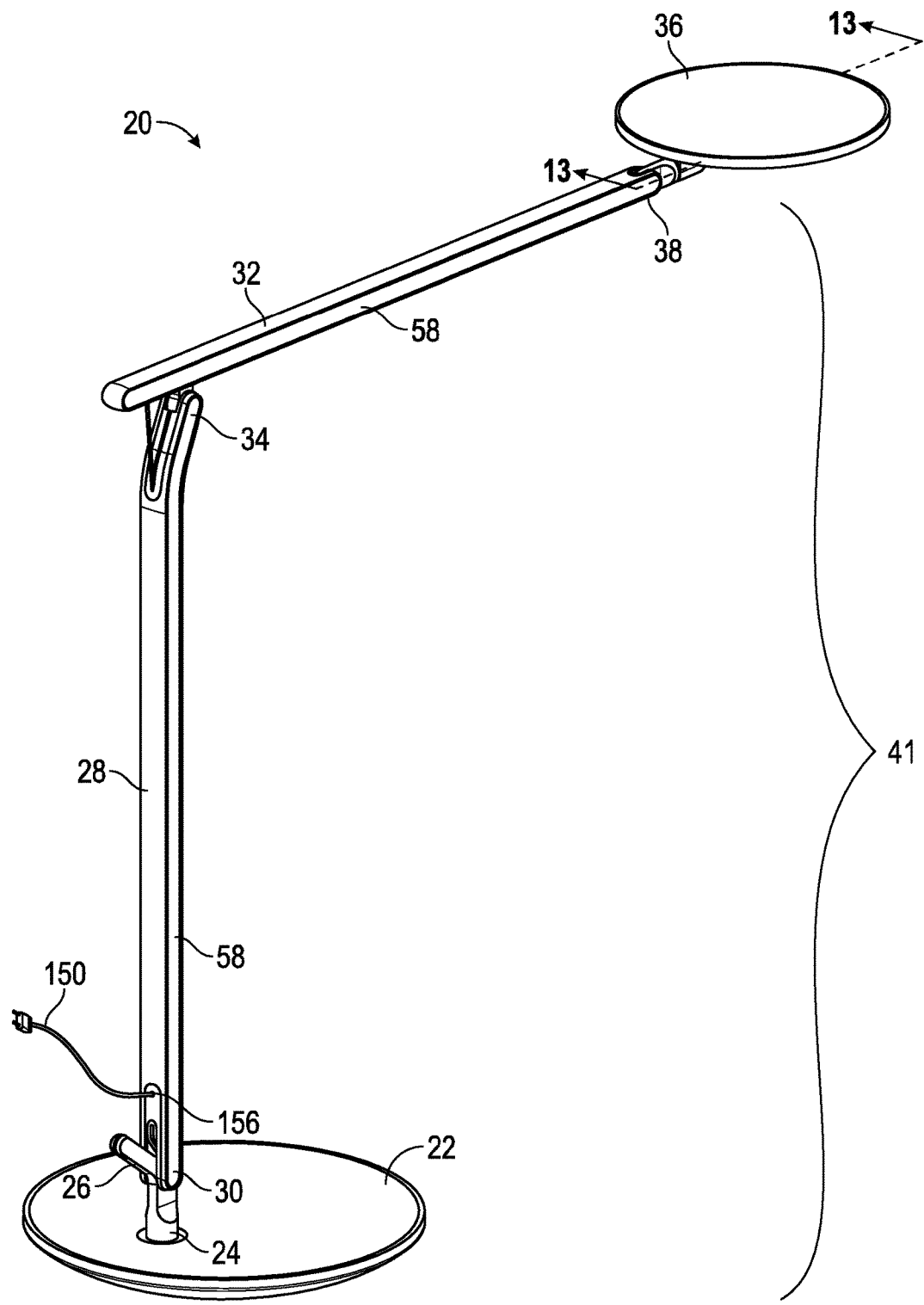
FIG. 1 is a top perspective of a lamp according to embodiments of the present disclosure.
Figure 2:
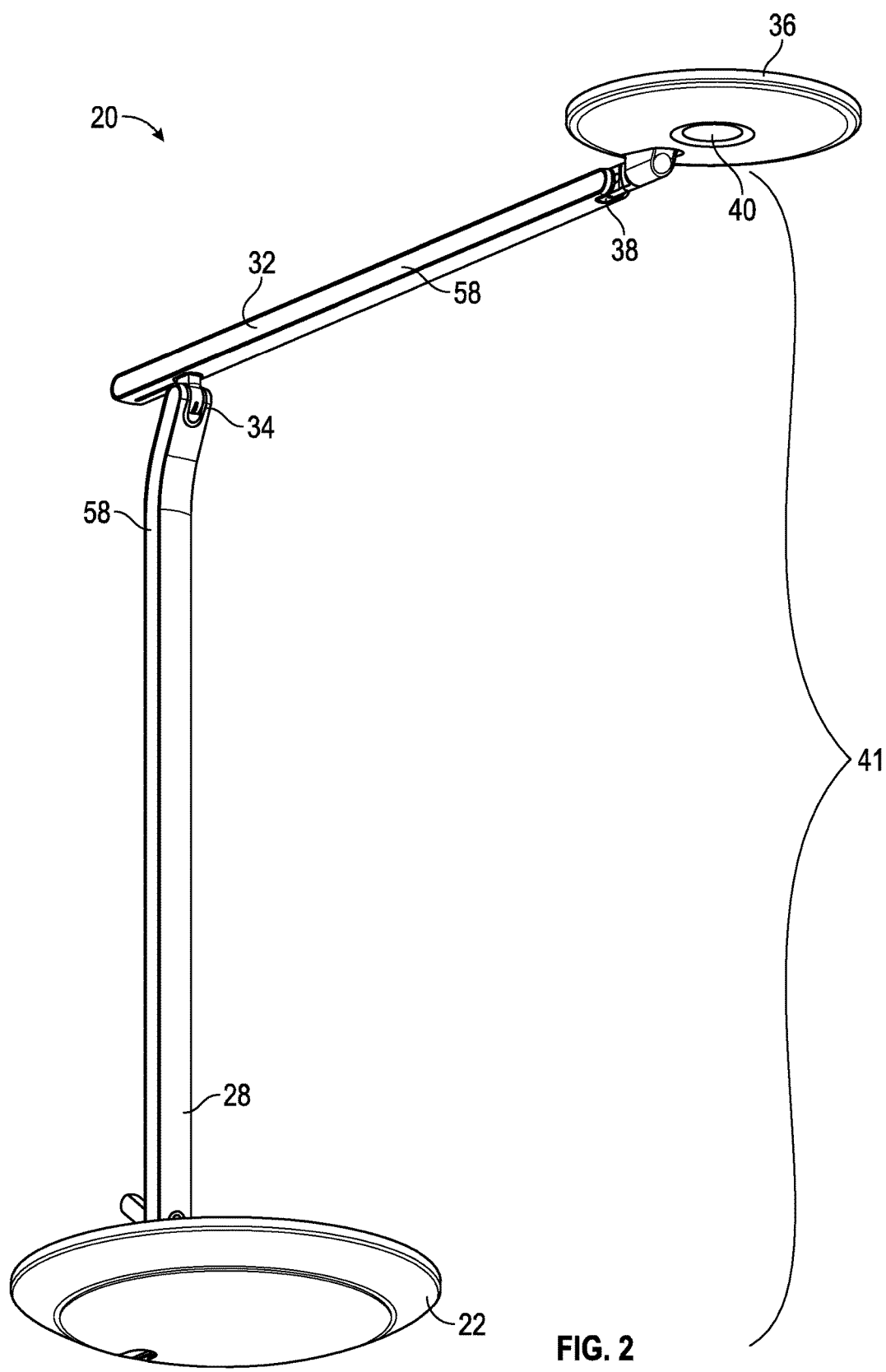
FIG. 2 is a bottom perspective of the lamp of FIG. 1.

Turning to FIGS. 1 and 2, a lamp 20 is shown according to one embodiment. The lamp 20 is shown with a base 22. The base 22 may be configured to rest on a support surface such as a desktop or the floor. The illustrated embodiment may be commonly referred to as a task light by one of ordinary skill. In other embodiments, the base 22 may be configured for mounting to a wall or a vertical panel, or may comprise a clamp or other more permanent mounting fastener. In other words, the base 22 may take a large variety of known configurations. As such, one or more of the novel features of the present disclosure may be applied to task lights, floor lights, reading lights, etc.

The illustrated embodiment of the lamp 20 includes a base stem 24 having a projection 26. The base stem 24 may be configured to rotate relative to the base 22. In the illustrated embodiment, the base stem 24 is configured to rotate about an axis perpendicular to the support surface on which the base 22 is configured to rest.

Staying with FIGS. 1 and 2, a lower arm 28 is attached to the base stem 24 at a lower joint 30. The lower joint 30 is shown as a pivot connection between the lower arm 28 and the base stem 24. The pivot axis of the lower joint 30 is shown as generally perpendicular to the axis of rotation of the base stem 24, such that the lower arm 28 has a substantial ability to move relative to the base 22.

The lamp 20 as shown in FIGS. 1 and 2 also includes an upper arm 32. The upper arm 32 is joined to the lower arm 28 at an intermediate joint 34. The intermediate joint 34 is configured to allow relative motion between the lower arm 28 and the upper arm 32 with respect to one or more reference axes. As discussed further below, the intermediate joint 34 is also configured to allow for the passage of electrical current from a location upstream (i.e., toward the base 22) of the intermediate joint 34 to a location downstream (i.e., toward a head 36). While the lamp 20 in the illustrated embodiment includes an upper arm 32 and a lower arm 28, additional arms, and respective joints, are also contemplated. Alternatively, embodiments of the lamp 20 may only comprise a single arm.

The upper arm 32 supports the head 36 of the lamp 20. The head 36 may be attached to the upper arm 32 by an upper joint 38. The upper joint 38 may be configured to allow relative movement between the head 36 and the upper arm 32 with respect to one or more reference axes. As discussed further below, the upper joint 38 is also configured to allow for the passage of electrical current from a location upstream (i.e., toward the base 22) of the upper joint 38 to a location downstream passed the upper joint 38 and into the head 36 for powering a primary light source 40 located within the head.

Again, the lamp 20 according to the present disclosure is defined by the claims and not by the illustrated embodiment shown in FIGS. 1 and 2. The lamp 20 may be a task light as illustrated, may be a floor lamp with even longer arms, may include only one arm, or no arms at all. The lamp 20 may rest on a horizontal surface, be fixed to a vertical surface, or otherwise attach to a reference point. In its simplest form of a first embodiment, the lamp 20 includes a head 36 with a primary light source 40. The head 36 is attached to a support 41 that comprises at least one joint, the upper joint 38 for example. The lamp 20 is wired so that current passes upstream and downstream of the joint at least when the primary light source 40 is activated. In its simplest form of a second embodiment, the head 36 itself incorporates unique function and structure as discussed below, and the at least one joint may be optional.

Figure 3:
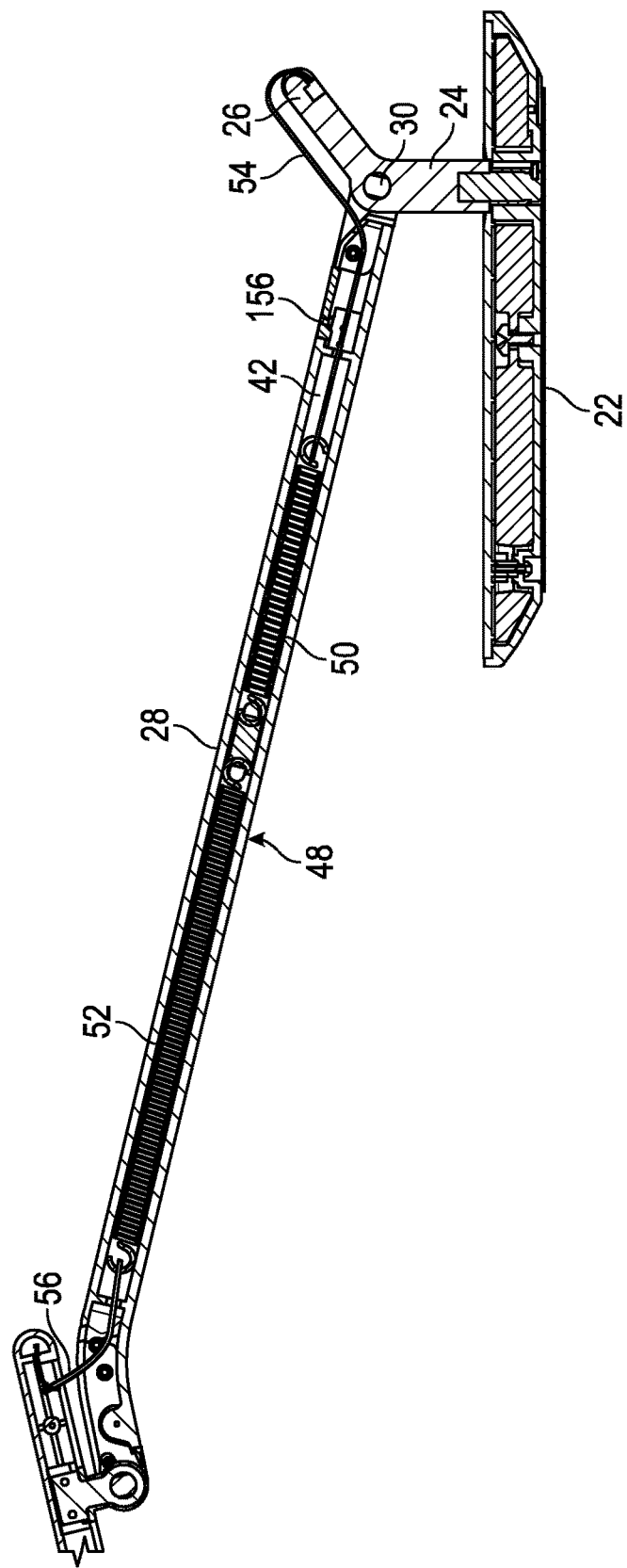
FIG. 3 is a cross sectional view of the lower arm of the lamp of FIG. 1 taken along the length of a lower arm.
Figure 4:
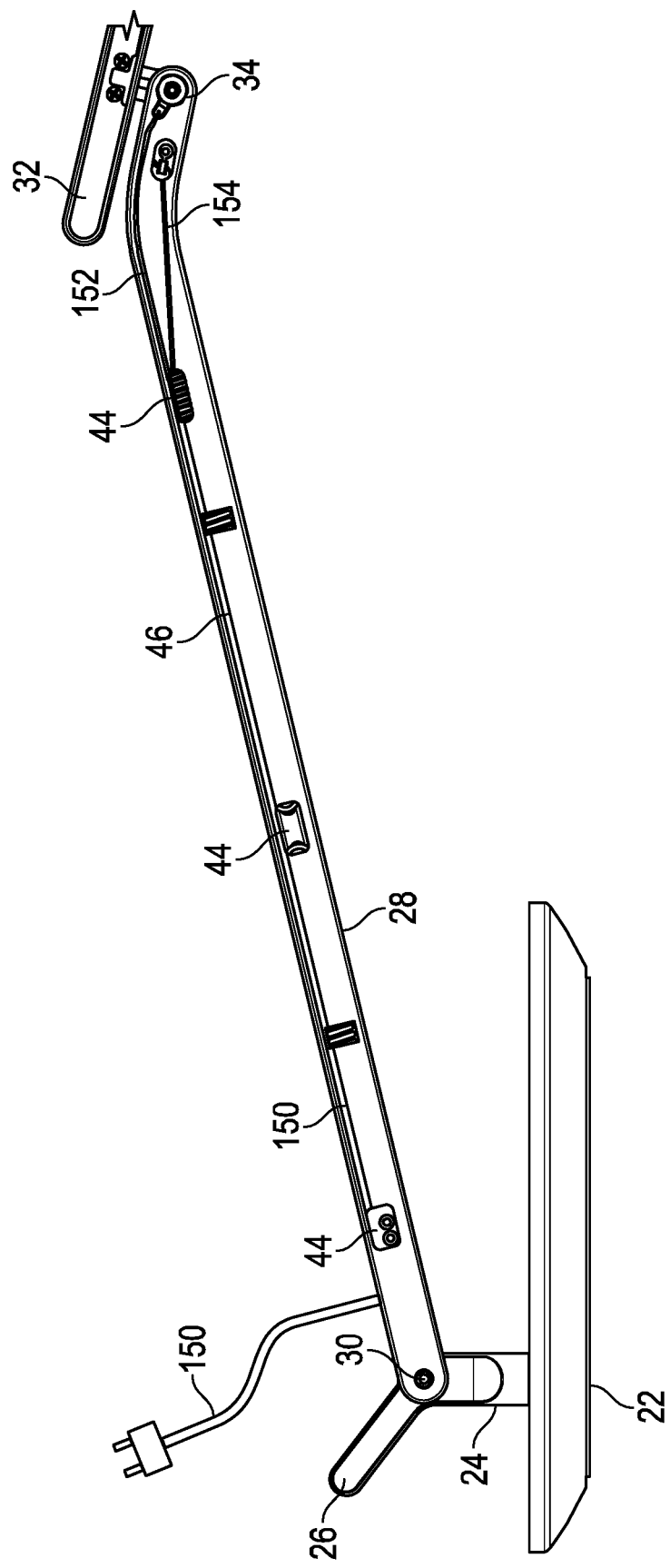
FIG. 4 is a side view of the lower arm of the lamp of FIG. 1 with a cover sheet omitted.

Turning to FIG. 3, the lower arm 28 is shown in cross section along the length of the lower arm. The lower arm 28 is formed primarily of an electrically conductive material, such as metal. Example materials include aluminum, steel, copper or conductive carbon or nanocarbon composite material. In one embodiment, the lower arm 28 is manufactured by casting or additive manufacturing (3-D printing) to allow the lower arm to be formed with an inner cavity 42 and side openings 44. Wiring channels 46, see FIG. 4, are formed along an exterior side of the lower arm 28. The casting method allows for the lower arm 28 to be formed with an elongated shape without having a constant profile along its length, and without significant additional machining steps during manufacturing. Forming the lower arm 28 by extrusion is also possible, but requires significant additional machining because the extrusion process would generate a conduit of constant profile, as known in the art. Forming the lower arm 28 with one or more side openings 44 eases assembly of the lamp 20 by allowing access to components from the side of the lower arm 28 instead of only having access from the ends of an extruded arm.

As seen in FIG. 3, the lower arm 28 at least partially houses a spring counterbalance system 48. The spring counterbalance system 48 assists with a smooth feel as the user moves the head 36 and arms 28, 32 relative to the base 22, thereby assisting the user to oppose the force of gravity. The spring counterbalance system 48 includes a lower spring 50 to assist motion at the lower joint 30, and an upper spring 52 to assist motion at the intermediate joint 34. The lower spring 50 may be fixed at an upper end thereof within the lower arm 28. A first cable 54 may be attached to a lower end of the lower spring 50. The first cable 54 may exit the lower arm 28 and be fixed to the projection 26. Thus, the lower spring 50 may be biased toward a contracted position that occurs when the lower arm 28 is lifted to be closer to the tip of the projection 26.

Similarly, the lower end of the upper spring 52 may be fixed within the lower arm 28. A second cable 56 may be relatively fixed to the upper arm 32 and pass into the lower arm 28 for attachment to the upper spring 52. The upper spring 52 is biased toward a contracted position that occurs when the upper arm 32 is lifted to be closer to parallel with the lower arm 28. While one embodiment of the spring counterbalance system 48 has been shown and described, other spring counterbalance systems are well-known in the art for assisting with motion of lamp components. One skilled in the art will appreciate that other spring counterbalance systems or even other counterbalance systems without springs may be suitable for use with lamps 20 as described herein.

Figure 5:
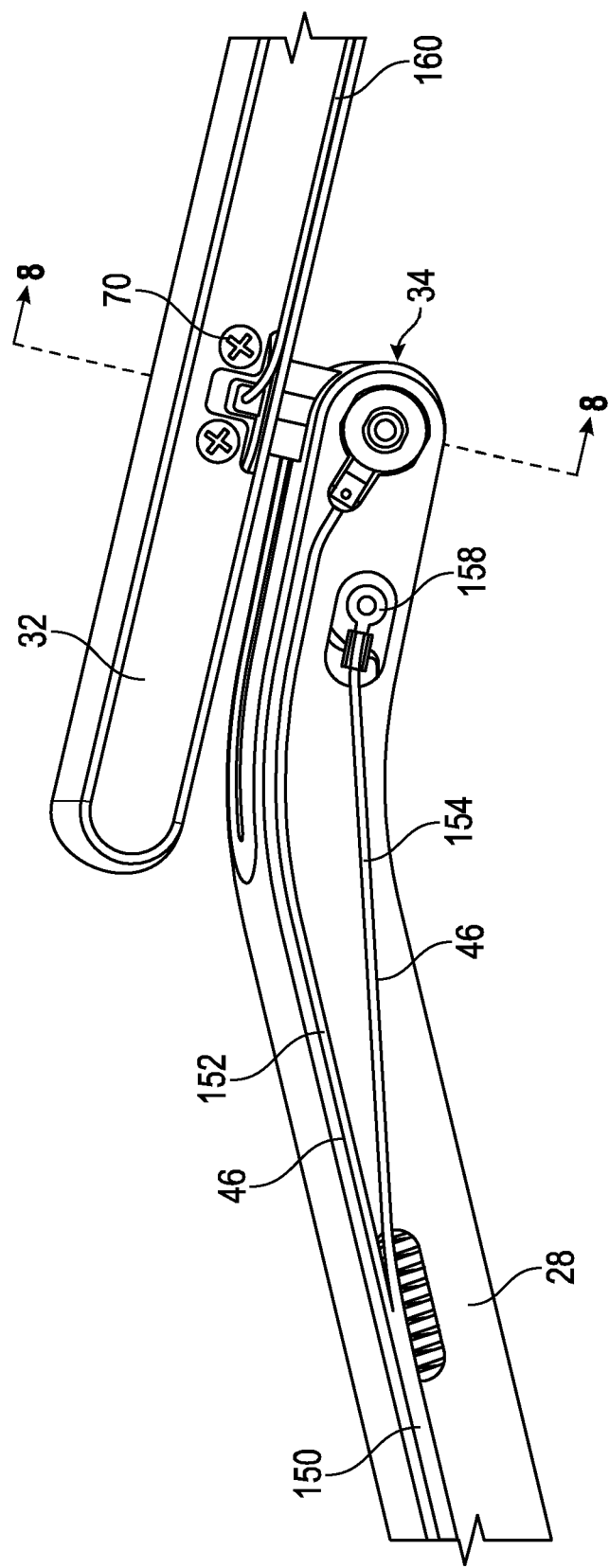
FIG. 5 is a detailed side view of an intermediate joint with the cover sheets omitted from each of the lower and upper arms.

The upper arm 32 may also be formed from a cast metal material to provide electrical conductivity along the upper arm. The upper arm 32 may also include side openings 44 and at least one wiring channel 46, as shown in FIG. 5, to facilitate assembly and wiring of the lamp 20.

As seen in FIGS. 1 and 2, cover sheets 58 may be attached to the sides of the lower arm 28 and the upper arm 32 to hide the sides of each arm and provide a clean finished appearance to the lamp 20. The cover sheets 58 may be attached by any known method, including adhesive, friction fit, fasteners, etc. The combination of the construction of the arms 28, 32, the internal components of the intermediate and upper joints 34, 38 as discussed below, and the cover sheets 58 provide the lamp 20 with its clean appearance with substantially hidden joints. The cover sheets 58 may be colored to provide a desired overall color scheme, to match other cover sheets placed atop other lamp elements, such as the base 22 or the head 36.

Figure 6:
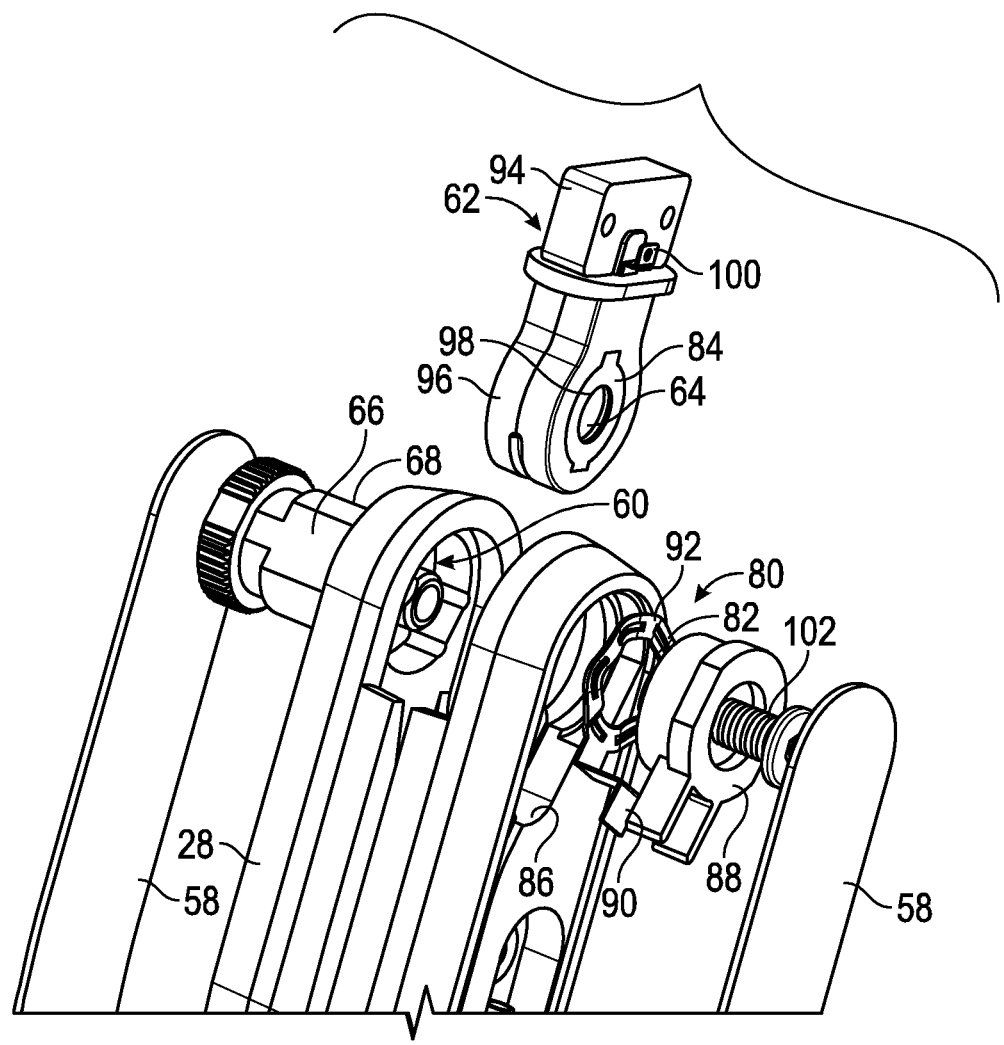
FIG. 6 is an exploded view of the components of the intermediate joint shown in FIG. 5.
Figure 7:
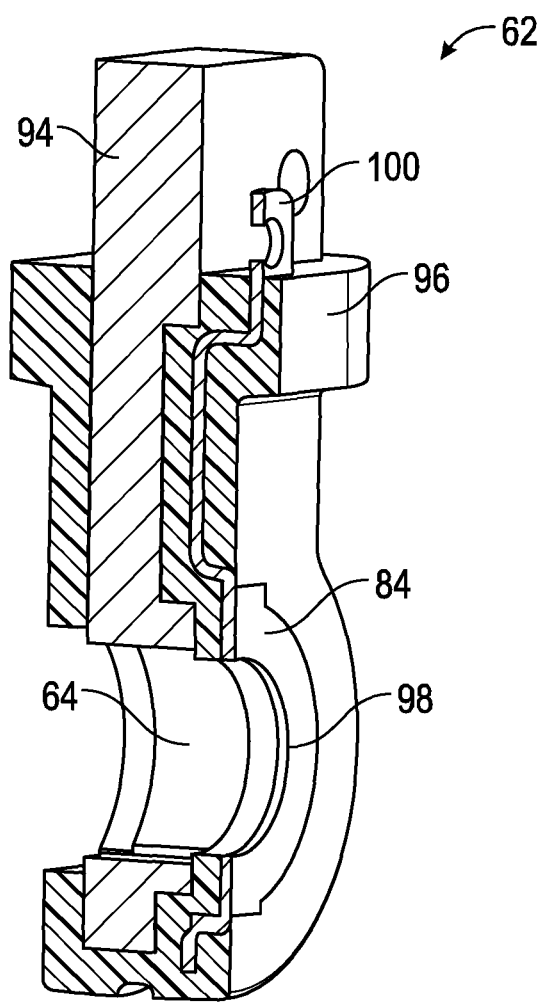
FIG. 7 is a perspective cross section of the spacer of the intermediate joint.

Turning to FIGS. 5-8, the intermediate joint 34 is shown in more detail. The lower arm 28 includes a first bore 60 passing through the lower arm near an upper end thereof. The upper end of the lower arm 28 may have a U-shape configured to straddle a portion of a first spacer 62. The first spacer 62 may be fixed to and extend from the upper arm 32. As seen in FIGS. 6 and 7, the first spacer 62 includes a first aperture 64 configured to align with the first bore 60 of the lower arm 28. In one embodiment, a torque insert 66 passes through the first bore 60 and the first aperture 64 to act as a pin connecting the lower arm 28 to the upper arm 32. The torque insert 66 allows relative rotation between the arms 28, 32 but includes an internal resistance for prevent unwanted rotation. As known in the art, torque inserts are designed to produce a predetermined resistance to rotation. The mechanics that allow torque inserts to provide resistance are known in the art. Example torque inserts are able from Leeco of Taiwan or from Reell of St. Paul, Minn. The torque inserts 66 used in the lamp 20 are configured to allow relative rotation between the arms 28, 32 when manipulated by the user, but are simultaneously configured to provide sufficient resistant that rotation at the intermediate joint 34 is not caused by gravity alone. Unwanted movement may be referred to in the industry as droop. In another embodiment a hinge (not shown) can be used that does or does not provide integrated torque resistance. The use of a hinge (defined herein to mean any component that permits with or without torque at least some rotational movement between rigid structures such as arms 28, 32), would permit manipulation by a user. Electrical conductive elements of the hinge could provide the electrical conductive paths as described herein. Further, the ability of the arms 28, 32 to remain in a selected orientation can be provided by using the counterbalance system 48, or components such as those known in the art including without limitation a friction hinge such as those available from GEM Products, Inc., of Orange Park, Fla., a constant torque hinge, a position hinge, a clutch, a torque hinge, a detent hinge, or set screws or adjustable protrusions adjacent the hinge to provide friction retention between arms 28, 32.

Figure 8:
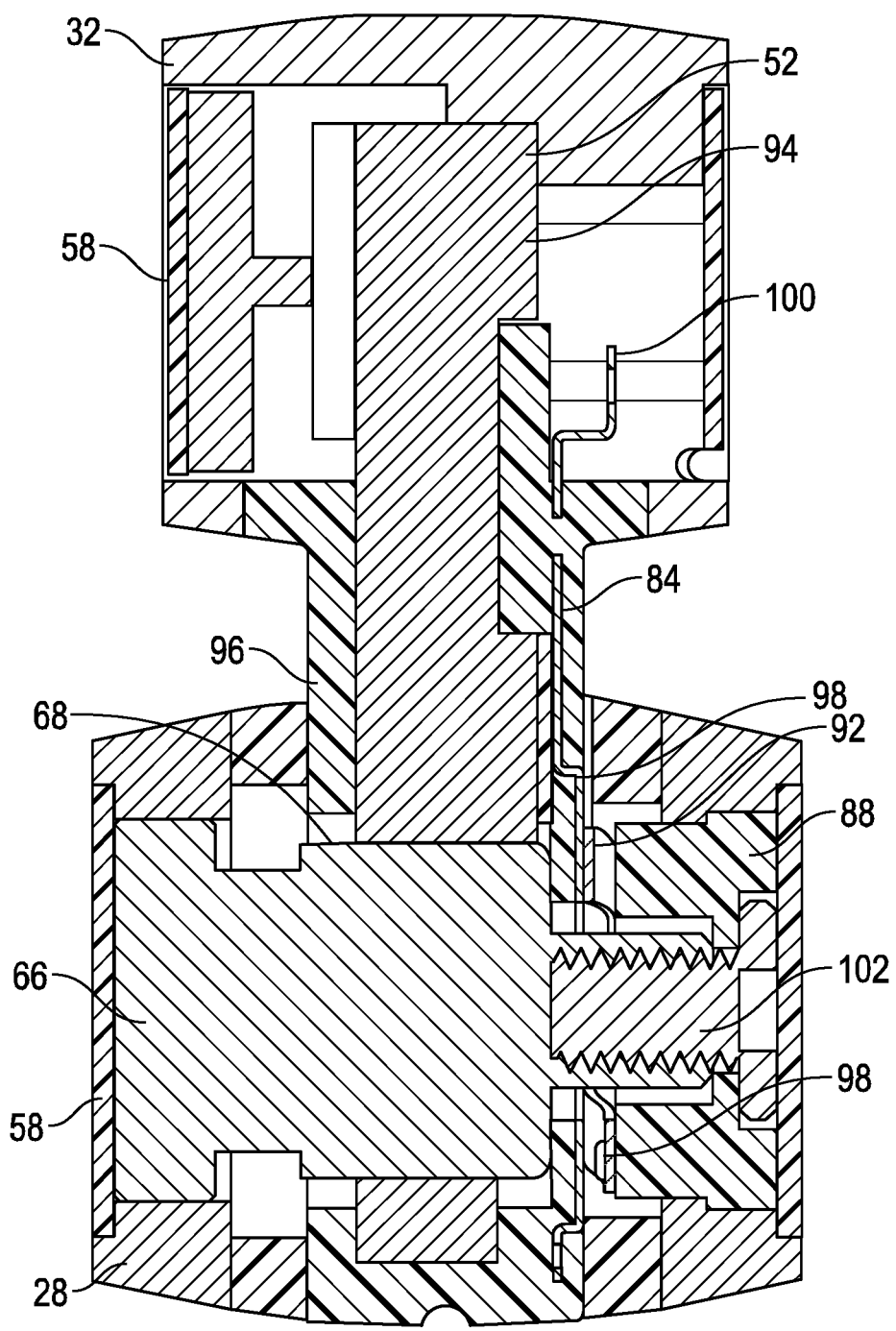
FIG. 8 is a cross section taken at plane VIII-VIII of FIG. 5.
Figure 9:
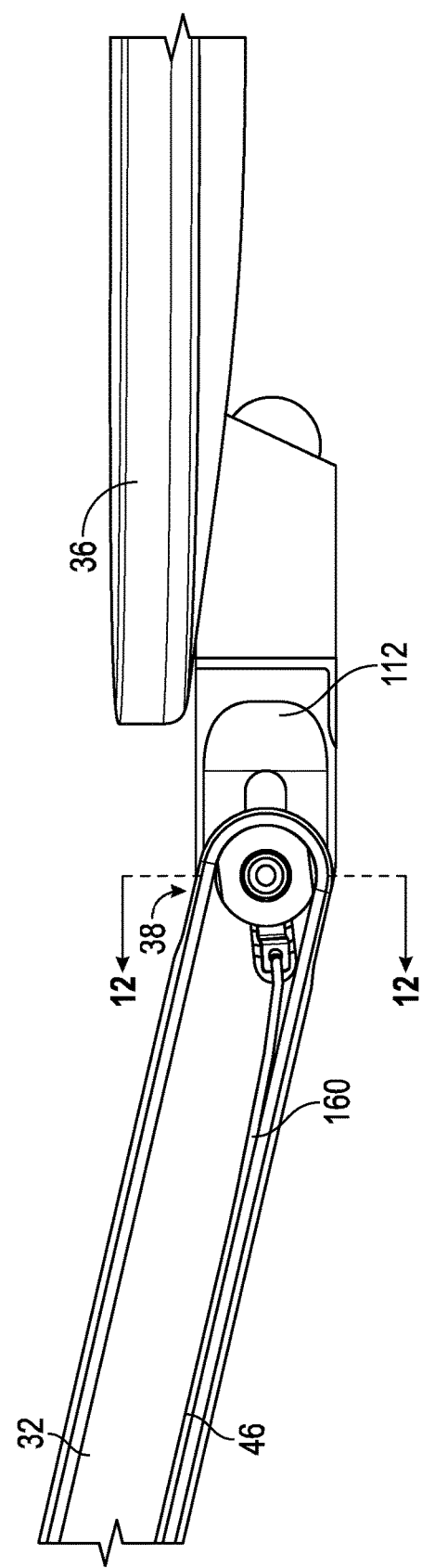
FIG. 9 is a detailed side view of an upper joint with the cover sheet omitted from the upper arm.
Figure 10:
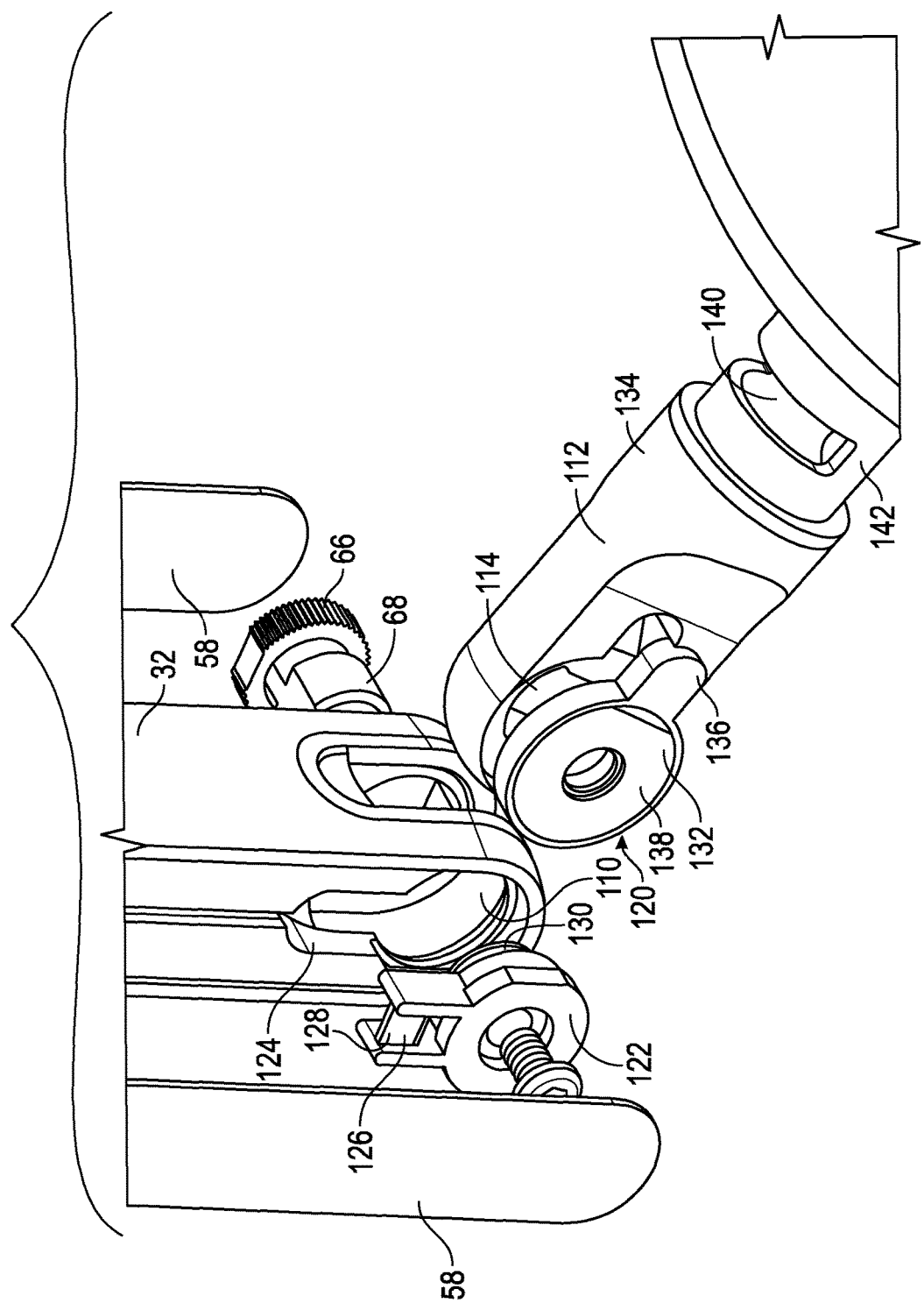
FIG. 10 is an exploded view of the components of the upper joint shown in FIG. 9.

The torque insert 66 is press-fit into a friction fit within the first bore 60 and the first aperture 64 as may be best understood from FIG. 8. The circumference of the first bore 60 and the circumference of the first aperture 64 may be keyed or otherwise deviate from a circular shape to match the outer periphery of the torque insert 66. The keyed shape helps to minimize slip between the torque insert 66 and either the lower arm 28 or the upper arm 32. While not shown, a torque insert 66 may also be used at the lower joint 30 to selectively allow pivotal motion between the base stem 24 and the lower arm 28, while providing resistance to avoid droop.

The exterior housing 68 of the torque insert 66 is made from metal or another electrically conductive material, as seen in FIG. 6. The press-fit between the torque insert 66 and at least a portion of the first bore 60 through the conductive lower arm 28 provides a continuation of a first conductive path from the lower arm into the exterior housing 68 of the torque insert. The first conductive path continues from the torque insert 66 into the first spacer 62 due to the press-fit between the torque insert and the first aperture 64. The first conductive path is able to continue because at least a portion of the first spacer 62 extending from the first aperture 64 is formed from a conductive material, such as steel or aluminum in one embodiment.

The first conductive path continues further from the first spacer 62 to the upper arm 32. As seen in FIG. 5, metal screws 70 simultaneously join the first spacer 62 with the upper arm 32 and provide contact to continue the conductive path from the first spacer 62 into the upper arm 32. The first spacer 62 may be joined to the upper arm 32 with other fasteners. Alternatively, the first spacer 62 may be integrated with the upper arm 32 in such a manner that contact between electrically conductive materials continues.

To summarize, the first conductive path proceeds from the lower arm 28 to the upper arm 32 by way of the first spacer 62 and the torque insert 66. The first conductive path may be characterized by the use of the upper and lower arms 28, 32 themselves as part of the first conductive path. The first path does not require, in this embodiment, a wire running from within the lower arm 28 to within the upper arm 32.

A second conductive path extends through the intermediate joint 34 with the use of a first sliding electrical contact 80. Therefore, the second conductive path, in this embodiment, is also formed without the need for a wire running from within the lower arm 28 to within the upper arm 32. The first sliding electrical contact 80 may be best seen in FIG. 6. The first sliding electrical contact includes a lower arm lead 82 and a first spacer lead 84. The lower arm lead 82 may reside within a first lead groove 86 formed in the lower arm 28. The first lead groove 86 may include the first bore 60 as a portion thereof. The lower arm lead 82 may be held in position within the first lead groove 86 by an electrically insulating first cap 88. The lower arm lead 82 may include a first terminal 90 and a first wave washer 92. The first wave washer 92 is configured to axially align with the first bore 60 and the first aperture 64. An inner radius of the first wave washer 92, however, is sufficient to avoid contact with the torque insert 66. As seen in FIG. 8, a portion of the first cap 88 may extend radially between the torque insert 66 and the first wave washer 92 in order to electrically isolate the first wave washer from the torque insert.

Maintaining electrical isolation between the first conductive path and the second conductive path is important to avoid shorting the circuit created by the lamp 20. As the current and voltage increase, the potential for arcing of current from one path to the other increases. To avoid arcing, the separation distance and/or the robustness of the insulator between the first and second conductive paths would need to increase. In one embodiment, the risk of arcing is low through the lamp 20 because the lamp may operate with low amperage.

As seen in FIG. 7, the first spacer lead 84 may be incorporated with the first spacer 62 as a module. To maintain electrical separation between the first conductive path, which passes through a body 94 of the first spacer 62, and the second conductive path, which passes through the first spacer lead 84, an insulating sheath 96 may be provided. The insulating sheath 96 is disposed between the body 94 of the first spacer 62 and the first spacer lead 84. The first spacer lead 84 may include a first annular contact 98 and a second terminal 100. The first annular contact 98 is configured to be axially aligned with the first bore 60 and the first aperture 64. The first annular contact 98 continues the second electrical path by contacting at least a portion of the first wave washer 92 of the lower arm lead 82. The first annular contact 98 also has an inner radius of sufficient size to avoid contact with the torque insert 66, and may be separated from the torque insert by a portion of the first cap 88. One of ordinary skill in the art will appreciate that while the illustrated embodiment has the first wave washer 92 associated with the lower arm lead 82, the wave washer could instead be associated with the first spacer lead 84 in place of the first annular contact 98. Alternatively still, the first sliding electrical contact may have two flat annular contacts and not a portion with a wave configuration.

The assembly of the intermediate joint 34 of the illustrated embodiment is completed by attaching a fastener 102 to the torque insert 66 as seen in FIG. 8, which in turn presses the first cap 88 toward the first spacer 62 to help ensure a sufficient pressing contact between the first wave washer 92 and the first annular contact 98 to extend the second conductive path from the first terminal 90 located upstream of the pivot point of the intermediate joint 34 to the second terminal 100 located downstream of the pivot point. One skilled in the art will appreciate that as the lower arm 28 is rotated relative to the upper arm 32, the first wave washer 92 will rotate with respect to the first annular contact 98 while maintaining at least one point of contact therewith.

By designing the intermediate joint 34 to provide the first and second conductive paths through distinct types of electrical relay as discussed above, the packaging space and the size of the torque insert 66 are reduced, allowing for more slender arms 28, 32 and a joint whose components are capable of being packaged within the width of the respective arm. Alternative constructions that use a pair of sliding electrical contacts in a single joint, or a bifurcated arm to conduct both paths therethrough, have been found to require a greater structure that can degrade the appealing and elegant nature of the design.

Turning to FIGS. 9-12, the upper joint 38 is shown in more detail. The features of the upper joint 38 are similar in many ways to the intermediate joint 34. A second bore 110 passes through an upper end of the upper arm 32. At least a portion of the upper arm 32 comprises an electrically conductive material extending continuously from the first spacer 62 to the second bore 110 such that the first conductive path extends substantially the entire length of the upper arm 32, and includes the conductive material of the upper arm itself. A torque insert 66 having a metal exterior housing 68 is press-fit into the second bore 110 to continue the first conductive path in a similar fashion as described with respect to the intermediate joint 34.

A second spacer 112, at least partially comprising an electrically conductive material, is used to connect the upper arm 32 to the head 36 at the upper joint 38. The second spacer 112 is shown in detail in FIG. 11. The second spacer 112 has a second aperture 114 to axially align with the second bore 110. The second spacer 112 is attached to the upper arm 32 by the torque insert 66, which also provides the continuation of the first conductive path from the exterior housing 68 into the second spacer 112.

A second sliding electrical contact 120 is provided for forming a portion of the second electrical path through the upper joint 38. Like the first sliding electrical contact 80, the second sliding electrical contact 120 is at least partially positioned by a second cap 122 inserted into the second bore 110 and a second lead groove 124 of the upper arm 32. The second cap 122 positions and electrically isolates an upper arm lead 126 of the second sliding electrical contact 120 from the upper arm 32. The upper arm lead 126 comprises a third terminal 128 and a second wave washer 130 similar to the lower arm lead 82 described above.

Figure 11:
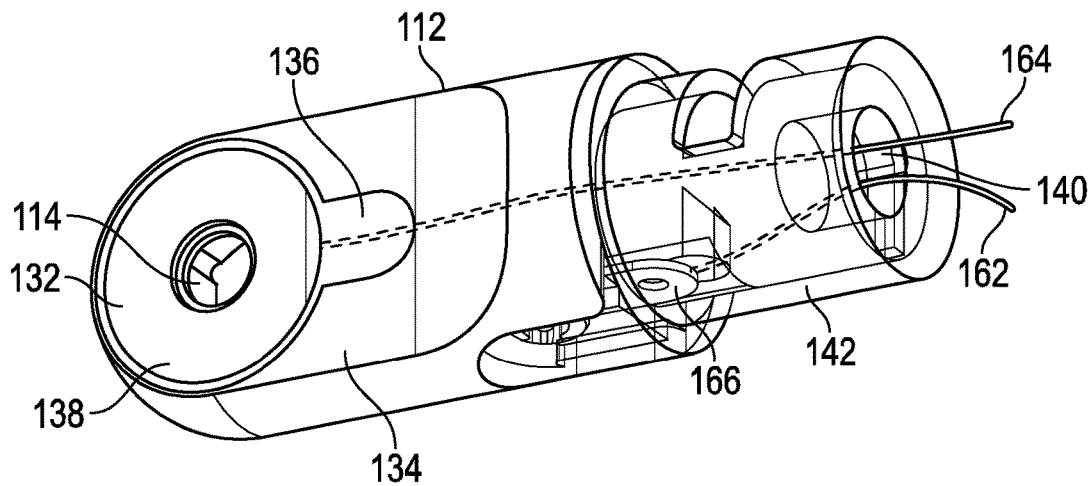
FIG. 11 is a detailed view of the spacer of the upper joint.

As seen in FIG. 11, the second spacer 112 includes a spacer lead 132 electrically isolated from the electrically conductive spacer body 134 of the second spacer by an insulation layer 136. The spacer lead 132 may include a second annular contact 138 to align with and contact the second wave washer 130. The spacer lead 132 also includes a fourth terminal (not shown). In the illustrated embodiment, the second spacer 112 is configured as a conduit with a passage 140 running longitudinally therein. The spacer lead 132 is configured such that the fourth terminal resides at least partially within the passage 140, and is electrically isolated from the conductive material of the spacer body 134 of the second spacer 112.

Figure 12:
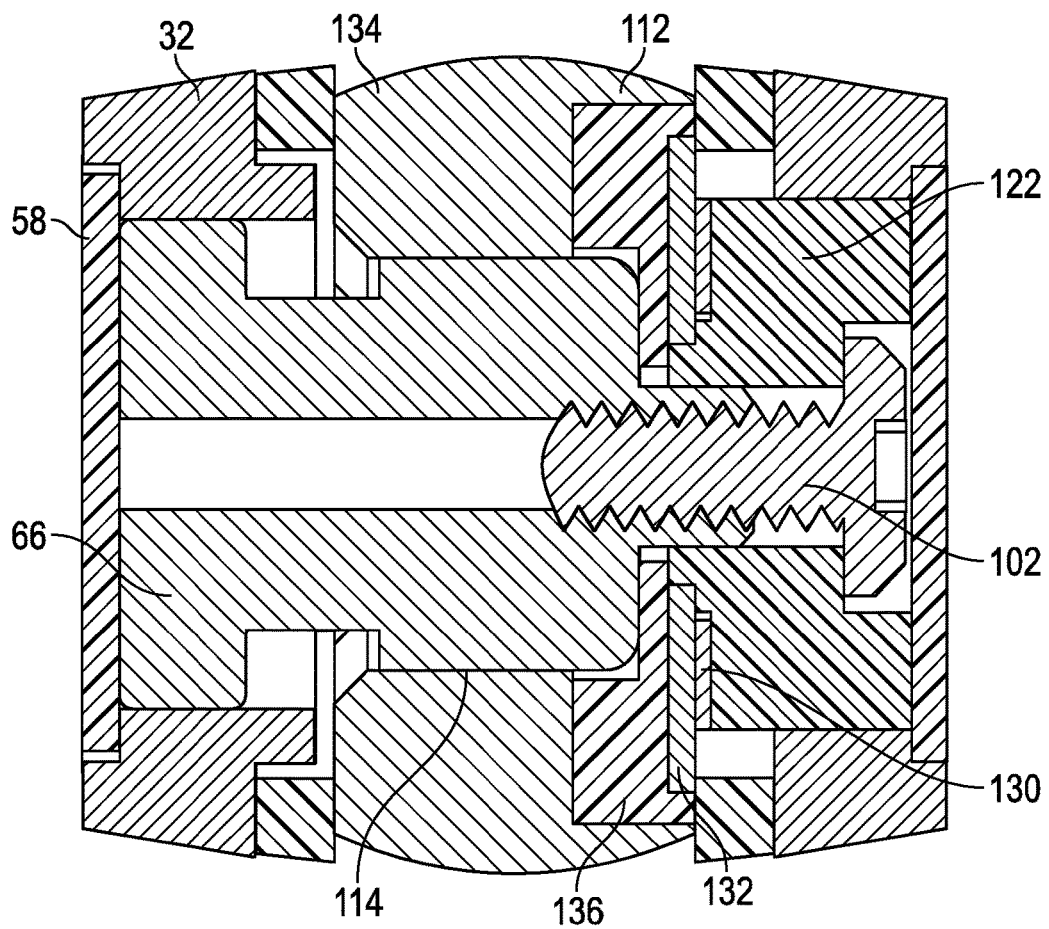
FIG. 12 is a cross section of the upper joint taken at plane XII-XII of FIG. 9.

The assembly of the upper joint 38 of the illustrated embodiment is completed by attaching a fastener 102 to the torque insert 66 as seen in FIG. 12, which in turn presses the second cap 122 toward the second spacer 112 to help ensure a sufficient pressing contact between the second wave washer 130 and the second annular contact 138 to extend the second conductive path from the third terminal 128 located upstream of the pivot point of the upper joint 38 to the fourth terminal located downstream of the pivot point within a passage 140 of the second spacer 112.

As seen in FIG. 11, the second spacer 112 also includes a sleeve 142 at least partially surrounding a portion of the second spacer. The sleeve 142 is formed from an electrical insulator to prevent the continuation of the first conductive path directly from the spacer body 134 of the second spacer 112 to the head 36. Isolating the head 36 from the charged spacer body 134 helps prevent interference with the electronics within the head 36.

Having described the mechanical structure of the support 41 of the lamp 20, use of that structure to provide current to the head 36 can now be more readily understood. The lamp 20 of the illustrated embodiment is configured to receive power in the form of AC current commonly available from wall sockets as known in the art. The lamp 20 has a power cord 150 that terminates at one end with a two-pronged plug as known in the art. The power cord 150 includes a first hot wire 152 (also known as a positive current wire) and a first neutral wire 154 (as known as a ground wire or negative current wire). As seen in FIG. 1, the power cord 150 may pass into the lower arm 28 through a cord opening 156. The power cord 150 may then immediately exit the side of the lower arm 28 through a side opening 44 and run along the wiring channel 46 as shown in FIG. 4.

Prior to reaching the upper end of the lower arm 28, the wiring channel 46 may split, and the first hot wire 152 is separated from the first neutral wire 154. In the illustrated example, the first neutral wire 154 is then connected into the first conductive path. For example, the first neutral wire 154 may be stripped and soldered to a crimp terminal 158 which is in electrical contact with the electrically conductive material of the lower arm 28. The lower arm 28 is then electrically charged when the plug is engaged with a source of current. The first hot wire 152, on the other hand, is feed into connection with the second conductive path by joining the first hot wire with the first terminal 90 of the first sliding electrical contact 80. While there may be some advantages to connecting the first neutral wire 154 to the first conductive path, the lamp 20 may operate sufficiently if the first hot wire 152 were connected to the first conductive path and the first neutral wire was then connected to the second conductive path.

Continuing on, the first conductive path passes the intermediate joint 34 as discussed above, without requiring a wire passing through the intermediate joint. After passing the intermediate joint 34, the first conductive path continues on to the upper joint 38 by way of the conductive material of the upper arm 32 itself.

The second conductive path passes the intermediate joint 34 through the first sliding electrical contact 80 as discussed above, without requiring a wire passing though the intermediate joint. The second conductive path then comprises a second hot wire 160 run along the upper arm 32 and connected between the second terminal 100 of the first sliding electrical contact 80 and the third terminal 128 of the second sliding electrical contact 120.

Upon arriving at the upper joint 38, the first conductive path continues from the upper arm 32 to the second spacer 112 via the exterior housing 68 of the torque insert 66 as discussed above. The second electrical path passes through the upper joint 38 by way of the second sliding electrical contact 120 as discussed above.

Then, in order to accommodate the input requirements of the electronics within the head 36, the first and second conductive paths should be recaptured within a second neutral wire 162 and a third hot wire 164 respectively. In the illustrated embodiment, the third hot wire 164 connects to the fourth terminal of the second sliding electrical contact 120 and runs through the passage 140 of the second spacer 112 into the head 36. Similarly, an additional terminal 166 receives the first conductive path from the conductive material of the spacer body 134 and transfers the first conductive path to the second neutral wire 162, which may also be feed through the passage 140 and into the head 36.

Figure 13:
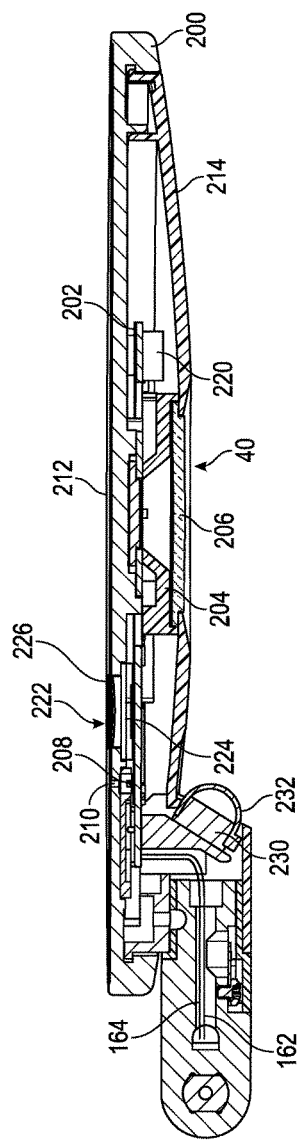
FIG. 13 is a cross section of the head of the lamp taken at plane XIII-XIII of FIG. 1.
Figure 14:
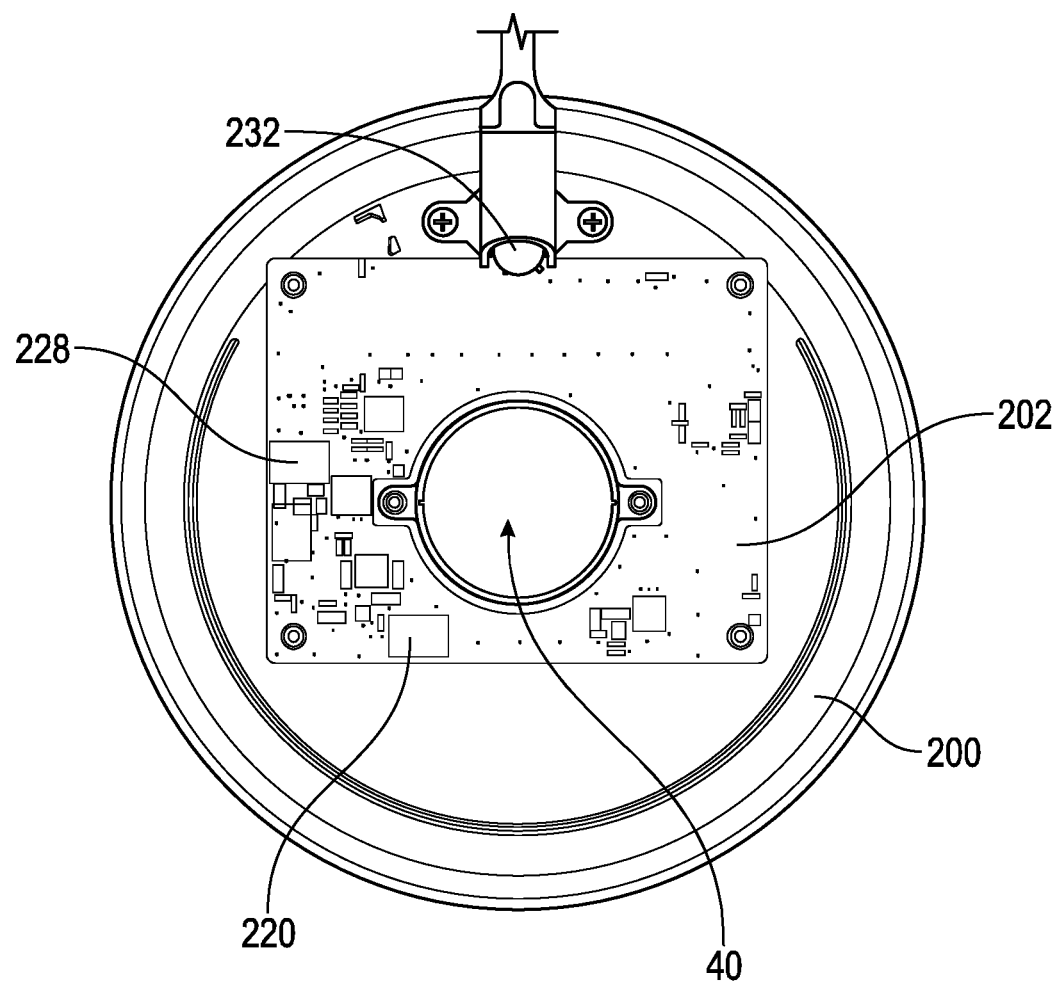
FIG. 14 is a bottom view of the head of the lamp with the cover removed.
Figure 15:
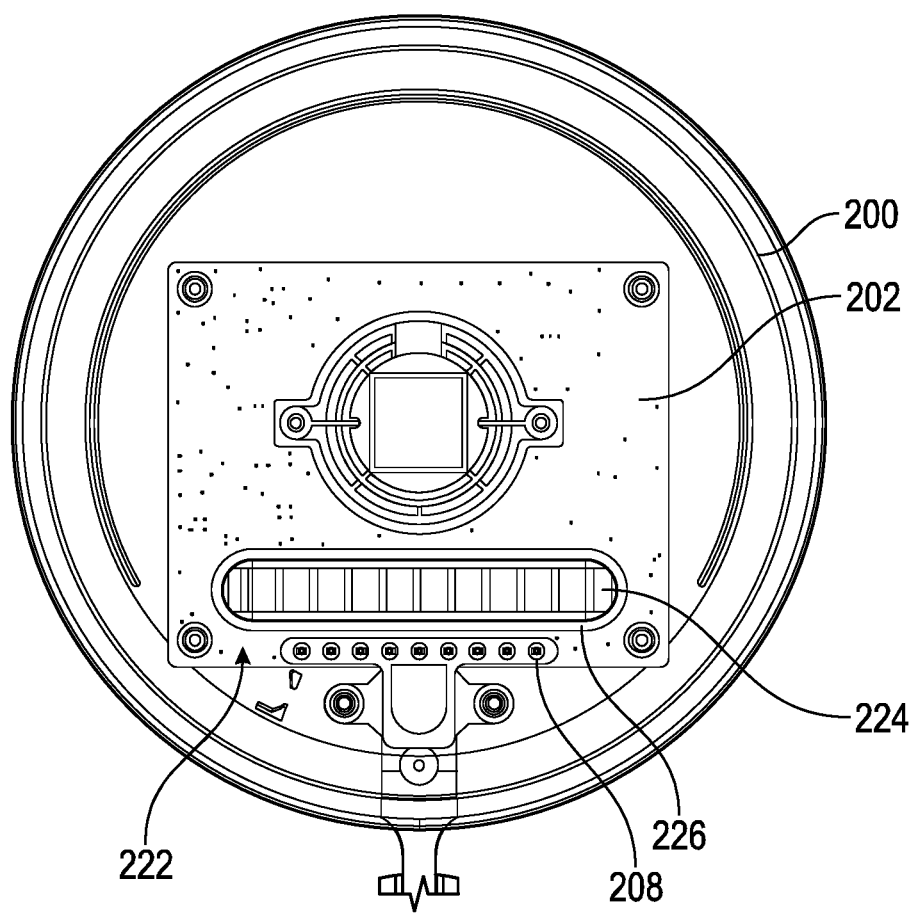
FIG. 15 is a top view of the head of the lamp with the cover sheet omitted, and the housing shown in phantom lines.

Turning to FIGS. 13-15, the head 36 is shown in more detail. The head 36 comprises a housing 200. The housing 200 at least partially provides an enclosure and acts as a heat sink for the primary light source 40. Thus, the housing 200 is preferably made from a thermally conductive material, such as cast aluminum. The primary light source 40 may include one or more light emitting diodes mounted to a circuit board 202 within the housing 200. The primary light source 40 and the circuit board 202 are then arranged relative to the housing 200 such that the housing 200 accepts and dissipates the heat generated by the primary light source. As known in the art, proper heat sinking of mid and high power light emitting diodes can increase their usable life.

The primary light source 40 may also include a reflector 204 and a lens 206 configured to distribute light from the one or more light emitting diodes into a desired pattern. Light emitted from the primary light source 40 is generally directed in a first direction relative to the housing 200. The first direction is often downward onto a support surface for the lamp 20.

One or more indicator light sources 208, such as light emitting diodes, may also be provided within the head 36. In the illustrated embodiment, the indicator light sources 208 are mounted to the circuit board 202 to emit light in a second direction, substantially opposite the first direction. The housing 200 may include one or more openings 210 aligned with the indicator light sources 208 to allow light emitted from the indicator light sources to pass through the housing. An applique 212 may be applied to the housing 200 over the openings 210 to hide the presence of the openings when light is not being emitted from the indicator light sources.

A cover 214 may be attached to the housing 200 to complete the enclosure of the circuit board 202 and other driving components within the head 36.

The electronics associated with the head 36 of the lamp 20 may optionally include several commonly used elements individually or in combinations, such as a driver, AC/DC converter, microprocessor, firmware, etc., as known in the art. The electronics may also include one or more sensors to facilitate one or more functions of the lamp. A first sensor may include a proximity sensor 220. The proximity sensor 220 may operate using capacitive sensing technology or other close range proximity sensor technology. The proximity sensor 220 may be mounted to the circuit board 202. In one embodiment, where the proximity sensor 220 is a capacitive sensor, the circuit board 202 is electrically connected to the housing 200 such that the proximity sensor 220 is electrically connected to the housing 200. When a charge is applied to the housing 200, substantially the entire housing 200 acts as part of the proximity sensor 220 to detect an approaching object, such as a user's hand, as is known in the art.

As is known in capacitance sensing, the user's hand forms the second half of a capacitor. As the distance between the hand and the housing 200 decreases, small changes in capacitance occur and can be monitored by firmware logic or a microprocessor. The proximity sensor 220 is preferably configured to detect when the user's hand, or other body part, is approaching the head 36 of the lamp 20, without requiring contact. In certain embodiments, the proximity sensor 220 is a capacitance sensor configured to detect approaching objections within a distance of 12 inches or less, 6 inches or less, 4 inches or less, or 3 inches or less from the housing 200 without requiring physical contact between the user and the housing 200. The sensitivity of the proximity sensor 220 will vary depending on whether the user approaches the housing 200 with their entire palm versus the tip of a finger. In other embodiments, it is possible that the proximity sensor 220 only detects actual contact between the user and the housing 200.

The proximity sensor 220 may employ dynamic sensing to avoid false positives. Specifically, the proximity sensor 220 is monitored for a change in capacitance, for example, as opposed to a predetermined threshold capacitance. If monitored for a predetermined capacitance threshold, other objects in the vicinity of the head 36 could produce noise that are picked up as half of the monitored capacitor. For example, a computer display monitor near the head 36 may create a false positive. To compensate, the proximity sensor 220 is monitored for a change. Thus the capacitance level occurring with the computer monitor nearby is factored out and set as the initial capacitance. Introduction of the user's hand into range of the proximity sensor 220 than causes a change in capacitance allowing the lamp 20 to react as discussed below.

In one embodiment, the proximity sensor 220 is operably connected to the indicator light sources 208. Applicant has found that the indicator light sources 208 should principally remain off when the lamp 20 is not in-use, as well as when the primary light source 40 is illuminated. Having the indicator light sources 208 continuously illuminated while the primary light source 40 is on may be distracting to a user. Thus, when the proximity sensor 220 detects an approaching object, one or more of the indicator light sources 208 may be triggered to illuminate. The indicator light sources 208 would extinguish when the user's hand is withdrawn or after a predetermined period of time, such as five seconds.

The indicator light sources 208 may serve several purposes. First, illumination of the indicator light sources 208 provides visibility of their location through the applique 212. The indicator light sources 208 may act as a location indicator of a user interface 222 of the lamp 20. The number or pattern of the indicator light sources illuminated may provide the user with an indicator of the operational mode of the lamp 20. Operational modes may include, "on", "off", various brightnesses, "night mode" to provide a very dim light only, "demo" mode, or to enable or disable certain functions of the lamp 20.

In one embodiment, the primary light source 40 is controlled through the user interface 222. The user interface 222 may allow the user to provide commands that turn the primary light source 40 on and off. The user interface 222 may also accept commands to adjust the intensity of the primary light source 40, such as 100%, 50% and a very dim night mode. In an embodiment, the user interface 222 includes the plurality of indicator light sources 208. The indicator light sources 208 may be arranged in a linear array as shown in FIG. 15. The indicator light sources 208 may be driven such that all of the indicator light sources illuminate when the primary light source 40 is at full brightness, and successively fewer of the indicator light sources illuminate as the primary light source is dimmed.

The user interface 222 may also include a track pad 224, exposed through a slot 226 in the housing 200. The track pad 224 may also be described as a touch surface or a slider. The track pad 224 may be part of a capacitance sensor 228 configured to detect the proximity or contact with a user, and translate the actions of the user into operational signals for driving the primary light source 40. Capacitance sensor technology is generally known in the art and commonly found in user interfaces outside of the lighting industry, such as touch screen computer displays. As such, one of ordinary skill in the art will understand that various gestures on or near the track pad 224 can result in adjustment in the operation of the primary light source 40. For example, the primary light source 40 may turn on and off in response to a tap upon the track pad 224. The primary light source 40 may be controlled to automatically return to the previous brightness setting. If the user slides their finger along the track pad 224, the primary light source 40 may increase or decrease intensity based on the direction of sliding. A touch of the track pad 224 may also set the brightness based on the location along the track pad being touched. A double tap may jump to maximum brightness. In an embodiment, the capacitance sensor 228 is configured to detect the user's hand or finger generally when there is contact with the track pad 224 or at least the portion of the applique 212 directly above the slot 226.

In addition to the user controlled functions of the lamp 20 discussed above, the head 36 may include a third sensor, such as a passive infrared sensor 230 configured to automatically control one or more operations of the lamp 20. In one example, the infrared sensor 230 is positioned behind a protective cover 232 and is provided with a wide field of vision. The infrared sensor 230 acts as a motion detector using infrared beam technology to detect motion of warm objects, such as humans, based on whether or not the object has crossed the beams being emitted. In practice, the infrared sensor 230 is operable to sensor the presence of a user at their workstation. If the primary light source 40 is illuminated, and the passive infrared sensor 230 has failed to detect motion for a predetermined period of time (e.g. 15 minutes), the electronics within the head 36 may trigger the primary light source 40 to extinguish. This feature prevents unnecessary or undesired use of energy. In some embodiments, the primary light source 40 may be triggered to illuminate, returning to the most recent illumination mode, when motion is detected by the infrared sensor 230 once again. When motion returns, the indicator light sources 208 may also temporarily illuminate to indicator to the user what the most recent illumination mode was. The user may have the option to disable and re-enable the infrared sensor 230, for example, by touching and holding at a portion of the track pad 224. A pattern of the indicator light sources 208 may flash to indicator when the operation mode (enabled versus disabled) of the infrared sensor has occurred. In other embodiments, the infrared sensor 230 may be disabled in the night mode of the lamp 20, so that the lamp remains on as a nightlight even after motion in the vicinity has stopped. Night mode may be achieved by holding the lowest position of the track pad 224. Again, night mode may be indicated by its own unique pattern of illuminated indicator light sources 208. In night mode, the intensity of the indicator light sources 208 may be dimmed, and the primary light source 40 set to its lowest intensity. The night mode may be highly applicable to use of the lamp 20 within the hospitality industry. The lamp may also have a demo mode, in which the infrared sensor 230 is adjusted to extinguish the primary light source 40 after only a few seconds of inactivity, instead of several minutes.

The present disclosure illustrates and discusses several embodiments for a lamp 20 with a support 41 having joints 34, 38 that facilitate transmittal of current in a clean and compact form factor that avoids exposed wires adjacent to the joints and hides the appearance of a pivot pin. One of ordinary skill in the art that the current transmitting joints (e.g. intermediate joint 34 and upper joint 38) may be used as part of a mounting or supporting apparatus for other electronic devices besides lamps. For example, a support 41 according to the present disclosure may be used to provide current up to a display or computer monitor. In another embodiment, instead of task lighting, the head 36 may be designed as a vanity mirror with illumination.

The lamp 20 with one or more joints as discussed above may be summarized in terms of the following paragraphs:

Paragraph A: A lamp, comprising:

a head having a light source; and at least one support arm supporting the head at a joint, the joint configured to allow relative motion between the at least one support arm and the head, wherein the joint comprises a sliding electrical contact and a torque insert, and wherein the at least one support arm is electrically conductive, and a ground wire is grounded to the support arm, which is in electrical contact with the torque insert.

Paragraph B: A lamp, comprising:

a head having a primary light source, the head connected to a support, the support comprising:

a first support portion at least partially comprising an electrically conductive material;

a second support portion at least partially comprising an electrically conductive material;

a first joint comprising a torque insert formed with a conductive exterior housing, the first joint connecting the first support portion to the second support portion to allow relative movement between the first support portion and the second support portion;

wherein the first joint provides two current conducting paths from the first support portion to the second support portion, wherein the first current conducting path comprises electrically charging the first support portion, and contact conduction from the electrically conductive material of the first support portion to the electrically conductive material of the second support portion through the exterior housing of the torque insert, and wherein the second current conducting path comprises a sliding electrical contact electrically isolated from the conductive material of the first support portion, the conductive material of the second support portion, and the torque insert.

A lamp 20 with one or more unique sensor-based functions as discussed above may be summarized in terms of the following paragraphs:

Paragraph C: A lamp, comprising:

a housing made at least partially from an electrically and thermally conductive material;

a primary light source positioned within the housing such that the housing dissipates heat generated by the primary light source, the primary light source configured to emit light in a first direction relative to the housing;

at least one indicator light source positioned relative to the housing to emit light in a second direction relative to the housing, the second direction being substantially opposite the first direction; and a first sensor electrically connected to the housing, wherein the first sensor is a capacitive proximity sensor that triggers illumination of the at least one indicator light source when a user's hand approaches the housing.

Paragraph D: The lamp according to Paragraph C, wherein the capacitive proximity sensor uses dynamic sensing to monitor for a change of capacitance as an object approaches the housing.

Paragraph E: The lamp according to Paragraph C, further comprising a second sensor, the second sensor being a capacitive sensor with a track pad, the track pad arranged adjacent to the at least one indicator light source and configured to receive commands to alter operation of the primary light source.

Paragraph F: The lamp according to Paragraph E, further comprising a third sensor, the third sensor being a motion sensor, the motion sensor configured to extinguish the primary light source when no motion has been detected for a predetermined amount of time.

The lamp 20 may be manufactured with a wiring method described by the following paragraphs as supported by the discussion above.

Paragraph G: A method of wiring a lamp, the lamp comprising a head having a light source and a first support portion, made from electrically conductive material, movable with respect to a second support portion made from electrically conductive material, the method comprising:
 feeding a cord into the first support portion, the cord comprising a first wire and a second wire;
 electrically connecting the first wire to the first support portion,
 electrically connecting the first support portion to the second support portion,
 electrically connecting a third wire from the second support portion to the light source,
 electrically connecting the second wire to a sliding electrical contact that is electrically isolated from the conductive material of the first support portion and the electrically conductive material of the second support; and
 electrically connecting a fourth wire from the sliding electrical contact to the light source.

Paragraph H: The method of Paragraph G, wherein the lamp further comprises a third support portion disposed between the first support portion and the second support portion, and the sliding electrical contact comprises a first sliding electrical contact and a second sliding electrical contact;
 wherein electrically connecting the first support portion to the second support portion comprises:
  electrically connecting the first support portion to the third support portion, and
  electrically connecting the third support portion to the second support portion;
 wherein, electrically connecting the second wire to the sliding electrical contact comprises connecting the second wire to the first sliding electrical contact;
 wherein, electrically connecting the fourth wire comprises electrically connecting the fourth wire to the second sliding electrical contact; and
 the method further comprises electrically connecting a fifth wire between the first sliding electrical contact and the second sliding electrical contact.

The lamp 20 may be manufactured with a method described by the following paragraph as supported by the discussion above.

Paragraph I: A method of making a support for a lamp, comprising:
 casting at least one support arm from an electrically conductive material, the at least one support arm being cast such that the at least one support arm does not have a constant profile along a length thereof;
 inserting a wire into an inner cavity of the at least one support arm;
 running a portion of the wire along an exterior of the at least one support arm;
 attaching a cover sheet to the at least one support arm to hide the portion of the wire.

The lamp 20 may be described by the following paragraphs in means-plus-function format as supported by the discussion above.

Paragraph J: A lamp comprising:
 a head having a light source; and
 at least one support arm supporting the head at a joint, the joint configured to allow relative motion between the at least one support arm and the head, the joint comprising:
  conductive means for providing a pair of electrically separate current paths through the joint.

Paragraph K: The lamp of paragraph J, further comprising an indicator light source; and
 sensor means for triggering activation of the indicator light source.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A lamp, comprising:
 a housing made at least partially from an electrically and thermally conductive material;
 a primary light source positioned within the housing such that the housing dissipates heat generated by the primary light source, the primary light source configured to emit light in a first direction relative to the housing;
 at least one indicator light source positioned relative to the housing to emit light in a second direction relative to the housing, the second direction being substantially opposite the first direction;
 a user interface; and
 a first sensor electrically connected to the housing, wherein the first sensor is a capacitive proximity sensor that triggers illumination of the at least one indicator light source if a user's hand approaches the housing, wherein the housing comprises a head of the lamp, wherein the user interface is positioned on the housing opposite the primary light source, and wherein the at least one indicator light source is adjacent to the user interface.

2. The lamp according to claim 1, wherein the capacitive proximity sensor uses dynamic sensing to monitor for a change of capacitance that occurs if the user's hand approaches the housing.

3. The lamp according to claim 1, further comprising a second sensor, the second sensor being a capacitive sensor with a track pad, the track pad arranged adjacent to the at least one indicator light source and configured to receive commands to alter operation of the primary light source.

4. The lamp according to claim 3, further comprising a third sensor, the third sensor being a motion sensor, the motion sensor configured to extinguish the primary light source if no motion has been detected for a predetermined amount of time.

5. The lamp according to claim 4, wherein the motion sensor is configured to activate the primary light source if motion is detected at a time after the primary light source was extinguished by the motion sensor.

6. The lamp according to claim 1, further comprising:
at least one support arm supporting the housing at a joint, the joint configured to allow relative motion between the at least one support arm and the housing,
wherein the joint comprises a sliding electrical contact and a torque insert, and
wherein the at least one support arm is electrically conductive, and a ground wire is grounded to the support arm, the support arm being in electrical contact with the torque insert.

7. The lamp according to claim 6, wherein the sliding electrical contact comprises a wave washer contacting with an annular contact as the wave washer rotates relative to the annular contact.

8. The lamp of claim 1, wherein the first sensor is electrically connected to the electrically and thermally conductive material of the housing.

9. The lamp of claim 8, wherein the electrically and thermally conductive material of the housing forms at least a portion of an exterior of the housing.

10. The lamp according to claim 1, wherein:
the housing is connected to a support, the support comprising:
a first support portion at least partially comprising an electrically conductive material;
a second support portion at least partially comprising an electrically conductive material;
a first joint comprising a torque insert formed with a conductive exterior housing, the first joint connecting the first support portion to the second support portion to allow relative movement between the first support portion and the second support portion;
wherein the first joint provides two current conducting paths from the first support portion to the second support portion,
wherein a first current conducting path comprises electrically charging the first support portion and contact conduction from the electrically conductive material of the first support portion to the electrically conductive material of the second support portion through the exterior housing of the torque insert, and
wherein a second current conducting path comprises a sliding electrical contact electrically isolated from the conductive material of the first support portion, the conductive material of the second support portion, and the torque insert.

11. The lamp of claim 10, wherein at least one of the first support portion and the second support portion is an elongated arm that does not have a constant cross section along a length thereof.

12. The lamp of claim 11, wherein the elongated arm comprises at least one channel along an outside thereof for receiving a wire.

13. The lamp of claim 12, further comprising at least one cover sheet attached to the arm for hiding the wire.

14. The lamp of claim 10, wherein the first joint further comprises a spacer having a body formed from an electrically conductive material.

15. The lamp of claim 14, wherein the spacer further comprises an insulating portion and a lead, the lead being adjacent to the insulating portion to be electrically isolated from the body, where the lead forms half of the sliding electrical contact.

16. The lamp of claim 10, wherein the sliding electrical contact comprising a wave washer rotatable with respect to and in pressing contact with an annular contact.

17. The lamp of claim 10, wherein the support further comprises:
a third support portion at least partially comprising an electrically conductive material; and
a second joint connecting the second support portion to the third support portion to allow relative movement between the second support portion and the third support portion;
wherein the second joint also provides two current conducting paths from the second support portion to the third support portion,
wherein the first current conducting path comprises electrically charging the second support portion and contact conduction from the electrically conductive material of the second support portion to the electrically conductive material of the third support portion, and
wherein the second current conducting path comprises a second sliding electrical contact electrically isolated from the conductive material of the second support portion and the conductive material of the third support portion.

18. A lamp, comprising:
a head made at least partially from an electrically and thermally conductive material;
at least one first light source positioned within the head such that the head dissipates heat generated by the at least one first light source, the at least one first light source configured to emit light in a first direction relative to the head in a pattern and at an intensity suitable for task lighting;
at least one second light source positioned relative to the head opposite the at least one first light source, the at least one second light source configured to provide an indication of an operating condition of the lamp when illuminated;
a user interface positioned on the head adjacent to the at least one second light source, and positioned on the head opposite the at least one first light source, the user interface configured to accept commands to change the operating condition of the lamp; and
wherein, if a user's hand approaches or touches the head, a capacitive proximity sensor operably causes activation of at least one of the at least one second light source.

19. The lamp of claim 18, wherein the user interface comprises a track pad as part of the capacitive proximity sensor.

20. The lamp head of claim 19, further comprising a motion sensor in operable connection with the at least one first light source.

21. The lamp of claim 18, wherein activation of the at least one second light source provides an indication of a location of the user interface.

22. A lamp, comprising:
a head made at least partially from an electrically and thermally conductive material;
a primary light source positioned within the head such that the head dissipates heat generated by the primary light source, the primary light source configured to emit light in a first direction relative to the head;
at least one indicator light source positioned relative to the head to emit light in a second direction relative to the head, the second direction being substantially opposite the first direction;
a first sensor electrically connected to the head, wherein the first sensor is a capacitive proximity sensor that triggers illumination of the at least one indicator light source if a user's hand approaches the head;

a second sensor, the second sensor being a capacitive sensor with a track pad for providing a user interface, the track pad positioned on the head opposite the primary light source and arranged adjacent to the at least one indicator light source and configured to receive commands to alter operation of the primary light source;

a third sensor, the third sensor being a motion sensor, the motion sensor configured to extinguish the primary light source if no motion has been detected for a predetermined amount of time, and is configured to activate the primary light source if motion is detected at a time after the primary light source was extinguished by the motion sensor; and at least one support arm supporting the head at a joint, the joint configured to allow relative motion between the at least one support arm and the head, wherein the joint comprises a sliding electrical contact and a torque insert, and wherein the at least one support arm is electrically conductive, and a ground wire is grounded to the support arm, the support arm being in electrical contact with the torque insert.

23. The lamp of claim 22, wherein the motion sensor is a passive infrared sensor.

* * * * *